(12) United States Patent
Kumar

(10) Patent No.: US 10,073,838 B2
(45) Date of Patent: Sep. 11, 2018

(54) METHOD AND SYSTEM FOR ENABLING VERIFIABLE SEMANTIC RULE BUILDING FOR SEMANTIC DATA

(71) Applicant: Wipro Limited, Bangalore (IN)

(72) Inventor: Shishir Kumar, Patna (IN)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 15/082,381

(22) Filed: Mar. 28, 2016

(65) Prior Publication Data

US 2017/0235718 A1     Aug. 17, 2017

(30) Foreign Application Priority Data

Feb. 12, 2016   (IN) .............................. 201641005050

(51) Int. Cl.
| | |
|---|---|
| *G06F 17/27* | (2006.01) |
| *G06F 17/28* | (2006.01) |
| *G06N 5/02* | (2006.01) |
| *G06F 17/30* | (2006.01) |

(52) U.S. Cl.
CPC ........ *G06F 17/279* (2013.01); *G06F 17/2785* (2013.01); *G06F 17/28* (2013.01); *G06N 5/025* (2013.01); *G06F 17/274* (2013.01); *G06F 17/30734* (2013.01)

(58) Field of Classification Search
USPC ....................................................... 704/9, 10
See application file for complete search history.

(56) References Cited

U.S. PATENT DOCUMENTS

| | | | |
|---|---|---|---|
| 2008/0228812 A1* | 9/2008 | Oglesby | .................... G06F 8/20 |
| 2012/0185517 A1 | 7/2012 | Sawant et al. | |
| 2013/0173643 A1 | 7/2013 | Ezzat | |
| 2013/0204610 A1* | 8/2013 | Wu | ....................... G06F 17/289 704/9 |

FOREIGN PATENT DOCUMENTS

| | | |
|---|---|---|
| CN | 103489056 A | 1/2014 |
| CN | 104268133 A | 1/2015 |
| JP | 2014-211725 | 11/2014 |

* cited by examiner

*Primary Examiner* — Vu B Hang

(74) *Attorney, Agent, or Firm* — Finnegan, Henderson, Farabow, Garrett & Dunner, LLP

(57) ABSTRACT

The present disclosure relates to a method and a system for enabling verifiable semantic rule building for semantic data. In one embodiment, the system enables verification of a semantic rule associated with semantic data based on natural language interpretation of the semantic rule. The system determines the natural language interpretation of the input semantic rule based on a predetermined semantic rule structure stored in a semantic data repository. Upon determining the natural language interpretation, the user may provide one or more inputs to modify the natural language interpretation. Based on the inputs, the system generates a modified natural language interpretation and modified semantic rule thus enabling user verified semantic rule building thereby improving interoperability of decision making processes.

13 Claims, 5 Drawing Sheets

METHOD AND SYSTEM FOR ENABLING VERIFIABLE SEMANTIC RULE BUILDING FOR SEMANTIC DATA

FIELD OF THE DISCLOSURE

The present subject matter is related, in general to semantic data processing, and more particularly, but not exclusively to a method and a system for enabling verifiable semantic rule building for semantic data.

BACKGROUND

Generally, decision support systems comprises domain-specific information stored within semantic knowledge base and user interfaces to allow interaction with the system for getting the right information needed to make the right decision at the right time. Domain-specific information is generally referred to as "ontologies" that are used for sharing knowledge and common understanding of a particular domain of interest, which makes communication between various beings possible and unambiguous. Communication may happen between various entities who may be human users or programmers with different level of expertise. Programmers are able to write semantic rules for semantic data in specified programming languages and store in the semantic knowledge base. However, a business user who is a non-programmer may not be able to read or write these semantic rules without the programming knowledge. This may impact the productivity of the business user as well as additional cost incurred for the team because now a programming specialist is always required for performing the reading or writing of these rules. Further, conventional decision support systems do not enable verification of the knowledge base using natural language as it is unreachable for current technology.

Therefore, there is a need for a method and a system that enables verifiable semantic rule building for semantic data using natural language interpretation and overcoming the disadvantages and limitations of the existing systems.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Accordingly, the present disclosure relates to a method of enabling verifiable semantic rule building for semantic data. The method comprising the step of receiving a semantic rule associated with the semantic data as input and determining a natural language interpretation corresponding to the input semantic rule based on a predetermined semantic rule structure. The method further comprising receiving a plurality of user actions to modify the natural language interpretation and generating a modified natural language interpretation and a modified semantic rule based on the plurality of user actions.

Further, the present disclosure relates to a system for enabling verifiable semantic rule building for semantic data. The system comprises at least a processor and a semantic data repository coupled with the processor and configured to store a predetermined semantic rule structure. The system further comprises a memory communicatively coupled with the processor, wherein the memory stores processor-executable instructions, which, on execution, cause the processor to receive a semantic rule associated with the semantic data as input. The processor is configured to determine a natural language interpretation corresponding to the input semantic rule based on the predetermined semantic rule structure. The processor is further configured to receive a plurality of user actions to modify the natural language interpretation and generate a modified natural language interpretation and a modified semantic rule based on the plurality of user actions.

Furthermore, the present disclosure relates to a non-transitory computer readable medium including instructions stored thereon that when processed by at least one processor cause a system to perform the act of receiving a semantic rule associated with the semantic data as input. Further, the instructions cause the processor to determine a natural language interpretation corresponding to the input semantic rule based on a predetermined semantic rule structure. The processor is further configured to receive a plurality of user actions to modify the natural language interpretation and generate a modified natural language interpretation and a modified semantic rule based on the plurality of user actions.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed embodiments. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
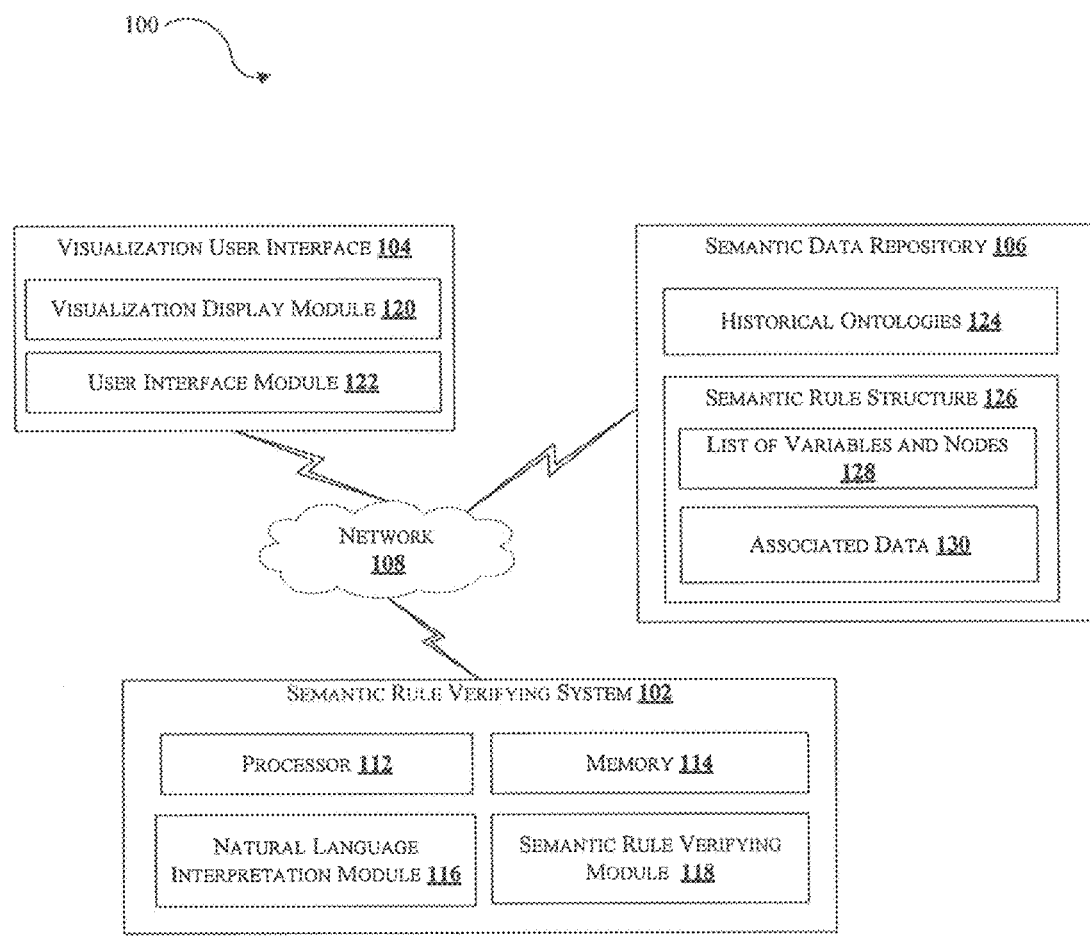
FIG. 1 illustrates an architecture diagram of an exemplary system for enabling verifiable semantic rule building for semantic data in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

The present disclosure relates to a method and a system for enabling verifiable semantic rule building for semantic data. In one embodiment, the system enables verification of a semantic rule associated with semantic data based on natural language interpretation of the semantic rule. The system determines the natural language interpretation of the input semantic rule based on a predetermined semantic rule structure stored in a semantic data repository. Upon determining the natural language interpretation, the user may provide one or more inputs to modify the natural language interpretation. Based on the inputs, the system generates a modified natural language interpretation and modified semantic rule thus enabling user verified semantic rule building thereby improving interoperability and effectiveness of decision making processes.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an architecture diagram of an exemplary system for enabling verifiable semantic rule building for semantic data in accordance with some embodiments of the present disclosure.

As shown in FIG. 1, the exemplary system 100 comprises one or more components configured for enabling verifiable semantic rule building for semantic data. In one embodiment, the exemplary system 100 comprises a semantic rule verifying system (hereinafter referred to as SRVS) 102, a visualization user interface (VUI) 104 and a semantic data repository 106 connected via a communication network 108. The SRVS 102 is configured to verify one or more semantic rules received as input based on predetermined semantic rule structure stored in the semantic data repository 106. In one example, the semantic data may be represented in resource description framework (RDF) and the semantic rule may be represented in Jena rule syntax.

The SRVS 102 comprises at least a processor 112, a memory 114, a natural language interpretation module (NLIM) 116, and a semantic rule verifying module (SRVM) 118. The NLIM 116 receives an input semantic rule from the user via the VUI 104 and generates corresponding natural language interpretation. In one embodiment, the input semantic rule may be generated based on a plurality of user actions received from the user via the VUI 104. The user may be, for example, a business user or a non-programmer who may be interested to verify semantic rules for the semantic data useful for business decision making. The VUI 104 comprises at least a visualization display module (VDM) 120 and a user interface module (UIM) 122 coupled with the VDM 120. The VDM 120 is configured to draw the rule workbench visualization canvas for displaying the semantic rule and corresponding natural language interpretation and the UIM 122 enables the user to provide the plurality of inputs to modify the semantic rule and the natural language interpretation displayed to the user. The rule workbench visualization canvas is configured with historical ontologies 124 that are domain-specific information associated with the semantic data stored in the semantic data repository 106. The semantic data repository 106 also stores predetermined semantic rule structure 126 along with the historical ontologies 124. The predetermined semantic rule structure 126 defines the organization structure of storing semantic rules. In one example, the predetermined semantic rule structure 126 comprises data associated with each semantic rule including list of variable names and nodes 128 and associated data 130. The NLIM 116 receives the input semantic rule from the user via the VUI 104 and generates corresponding natural language interpretation based on the predetermined semantic rule structure 126. Upon generating the natural language interpretation, the UIM 122 enables the user to provide inputs to modify the natural language interpretation. Based on the received user inputs, the SRVM 118 generates a modified natural language interpretation and thereafter a modified semantic rule based on the user inputs.

Figure 2A:
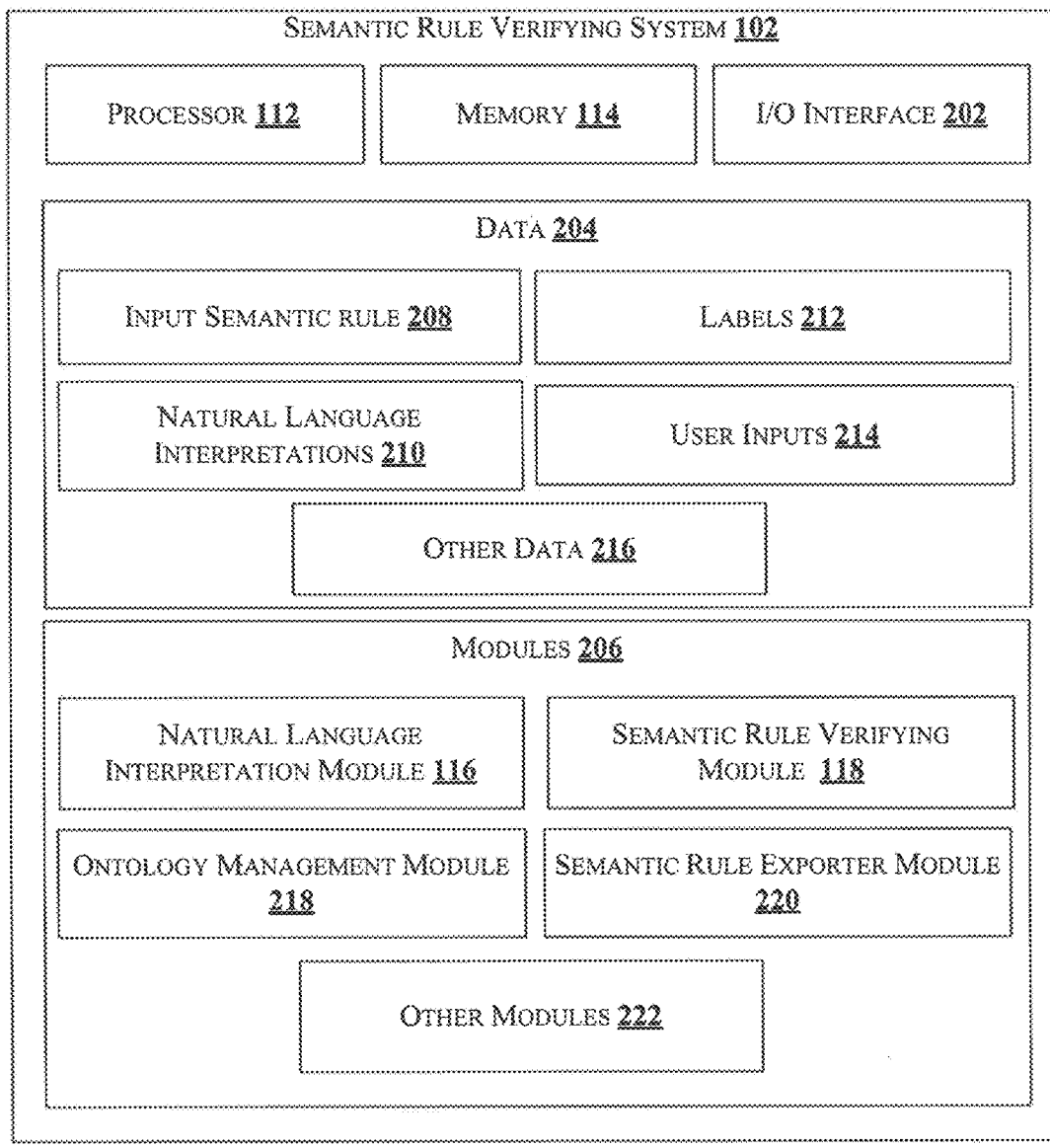
FIG. 2a illustrates an exemplary block diagram of a semantic rule verifying system of FIG. 1 in accordance with some embodiments of the present disclosure.

In one embodiment, the SRVS 102 may be a typical SRVS as illustrated in FIG. 2. The SRVS 102 comprises the processor 112, the memory 114, and an I/O interface 202. The I/O interface 202 is coupled with the processor 112 and an I/O device. The I/O device is configured to receive inputs via the I/O interface 202 and transmit outputs for displaying in the I/O device via the I/O interface 202. The SRVS 102 further comprises data 204 and modules 206. In one implementation, the data 204 and the modules 206 may be stored within the memory 114. In one example, the data 204 may include the semantic rule 208, natural language interpretation 210, a plurality of labels 212, one or more user inputs 214 and other data 216. In one embodiment, the data 204 may be stored in the memory 114 in the form of various data structures. Additionally, the aforementioned data can be organized using data models, such as relational or hierarchical data models. The other data 216 may be also referred to as reference repository for storing recommended implementation approaches as reference data. The other data 216 may also store data, including temporary data and temporary files, generated by the modules 206 for performing the various functions of the SRVS 102.

The modules 206 may include, for example, the NLIM 116, the SRVM 118, ontology management module (OMM) 218, and a semantic rule exporter module 220. The modules 206 may also comprise other modules 222 to perform various miscellaneous functionalities of the SRVS 102. It will be appreciated that such aforementioned modules may be represented as a single module or a combination of different modules. The modules 206 may be implemented in the form of software, hardware and/or firmware.

In operation, the SRVS 102 enables verifiable semantic rule building of semantic data. In one embodiment, the SRVS 102 receives the semantic rule 208 associated with the semantic data as input from the user via the VUI 104. The VDM 120 enables display of the rule workbench visualization canvas to the user loaded with the predefined or historical ontologies 124 from the semantic data repository 106. The historical ontologies 124 may include for example, class, property, and individual components associated with semantic data represented as nodes and edges connecting the nodes. In one example, at least class, property, and individual components are represented as nodes and at least property and variable components are represented as edges connecting the said nodes.

The OMM 218 manages ontologies of the semantic data. In one embodiment, the OMM 218 loads, creates, updates, reads, and deletes historical ontologies 124 stored in the semantic data repository 106. As will be appreciated by those skilled in the art, ontology is overall schema or metadata of a semantic web domain. The ontology OMM 218 enables ontology, domain—taxonomy, or domain— model controlled and configured by the SRVS 102. The VDM 118 also enables display of the input semantic rule 208 along with corresponding ontologies 124 onto the rule workbench visualization canvas.

Figure 2B:
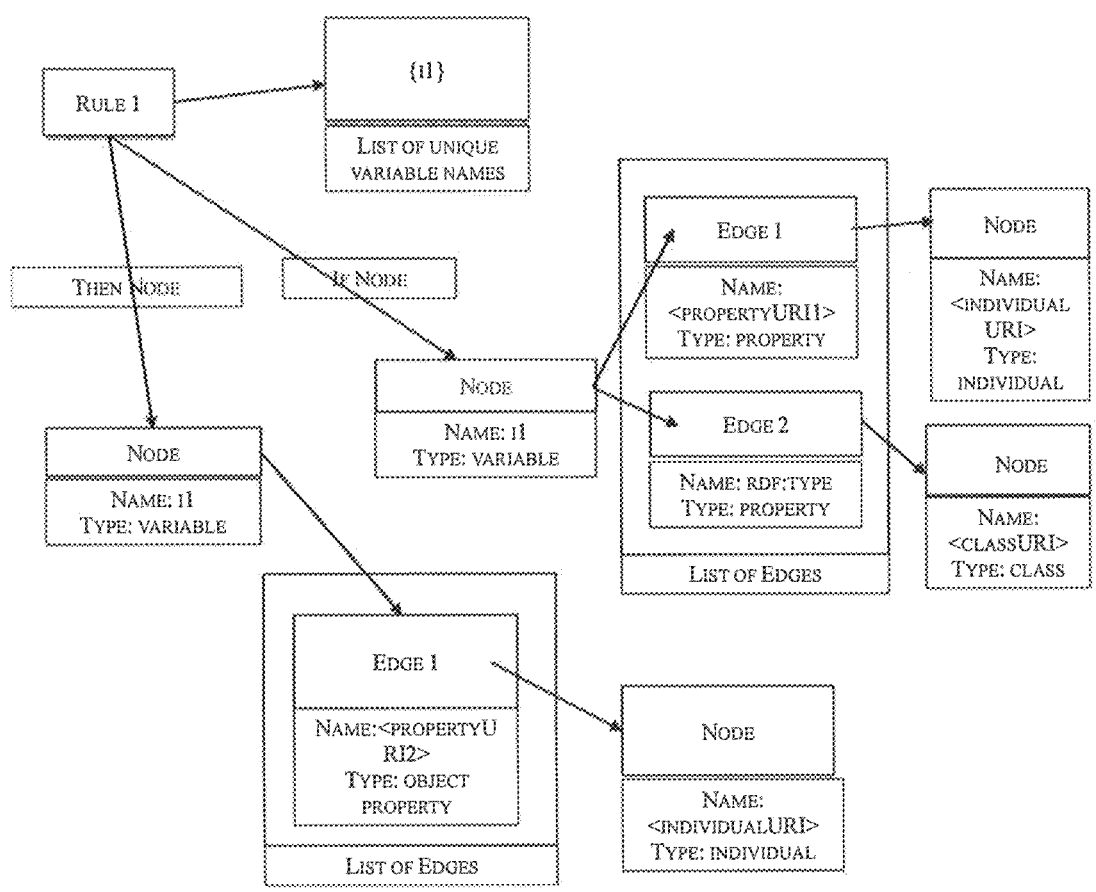
FIG. 2b illustrates an exemplary semantic rule structure for the semantic rule in accordance with some embodiments of the present disclosure.

The SRVS 102 generates a natural language interpretation of the input semantic rule 208 for verifying the input semantic rule 208 by the user. In one embodiment, the NLIM 116 receives the input semantic rule 208 and generates the natural language interpretation 210 of the received input semantic rule 208 based on the predetermined semantic rule structure 126 stored in the semantic data repository 106. In one implementation, the semantic rule structure 126 represents the organization structure of the semantic rules stored in the semantic data repository 106. FIG. 2b illustrates an exemplary semantic rule structure Rule 1. In one example, the semantic rule structure 126 comprises the list of variable names and nodes 128 and associated data 130. In one example, the list of variable names of the semantic rule may be represented as list of strings and the list of nodes correspond to antecedent "IF" and consequent "THEN" clauses associated with the semantic rule. Associated data 130 may comprise node information associated with the one or more nodes, and edge information associated with one or more edges representing the relationship between the one or more nodes. Node information associated with the one or more nodes may comprises at least a node identification number, name of the node, node type and list of edges associated with the node. In one example, the node identification number and name of the node may be represented as string, and the node type may be selected from one or more node types including at least "individual", "class", "property" and "variable". The list of edges indicates the list of edges associated with the node. The name of the node may be, for example, one of the unique variable names associated with the semantic rule or URI (Unique Resource Identifier) stored in the semantic rule structure 126. The edge information associated with the one or more edges comprises for each edge, at least a unique edge identifier, edge name, edge type and relevant node information associated with the edge. In one example, the unique edge identifier and edge name may be represented as string. Edge type may be selected from one or more edge types including at least "property", "variable" and so on. Relevant node information indicates identification number of the node that acts as a connected node of the current edge.

The NLIM 116 generates the natural language interpretation 210 of the input semantic rule 208 based on the semantic rule structure 126. In one embodiment, the NLIM 116 derives the list of one or more unique variable names and nodes, and corresponding node information and edge information associated with the input semantic rule 208. For example, the NLIM 116 derives the list of nodes corresponding to the antecedent and consequent clauses of the input semantic rule 208 and determines a plurality of labels 212 corresponding to the derived list of nodes of the input semantic rule 208.

In one embodiment, the NLIM 116 determines the plurality of labels 212 corresponding to the nodes of antecedent "IF" clauses of the input semantic rule 208. In one example, the plurality of labels 212 may be the name of the node and edges represented as variable names or URI. The NLIM 116 derives the list of nodes corresponding to the antecedent clauses (hereinafter referred to as antecedent nodes) of the input semantic rule 208 and determines the ontology label for each of the antecedent nodes based on the node type of each of the antecedent nodes. If the node type is determined to be one of "individual", "class", and "property", then the NLIM 116 obtains a first ontology label for example URI, previously stored in the semantic data repository 106. In another embodiment, if the node type is not determined to be one of "individual", "class", and "property", then the NLIM 116 determines the variable name information of the antecedent node from the semantic data repository 106 as the first ontology label of the antecedent node. If the NLIM 116 determines that the variable name information of the antecedent node is not stored in the semantic data repository 106, then the NLIM 116 derives a new variable name for the corresponding antecedent node as the first ontology label of the antecedent node.

The NLIM 116 further determines the list of edges associated with each of the antecedent nodes, derives the edge type and obtains corresponding ontology label for each of the edges associated with each of the antecedent nodes. In one example, if the NLIM 116 determines the edge type equal to "property", then the NLIM 116 obtains a second ontology label for example URI, previously stored in the semantic data repository 106. In another embodiment, if the node type is not determined to be equal to "property" "variable", then the NLIM 116 determines the variable name information of the edge from the semantic data repository 106 as the second ontology label. If the NLIM 116 determines that the variable name information of the edge is not stored in the semantic data repository 106, then the NLIM 116 derives a new variable name for the corresponding edge as the second ontology label.

Furthermore, the NLIM determines a right connected (RC) node for each of the derived edges and determines the node type of the RC node and obtains a third ontology label corresponding to the RC Node based on the RC node type. In one example, if the NLIM 116 determines the type of the RC node to be one of "individual", "class", and "property", then the NLIM 116 obtains the third ontology label for example URI, previously stored in the semantic data repository 106. In another embodiment, if the node type is not determined to be one of "individual", "class", and "property", then the NLIM 116 determines the variable name information of the RC node from the semantic data repository 106 as the third ontology label of the RC node. If the NLIM 116 determines that the variable name information of the RC node is not stored in the semantic data repository 106, then the NLIM 116 derives a new variable name for the corresponding RC node as the third ontology label. Upon determining the plurality of labels 212 including the first, the second and the third ontology labels, the NLIM 116 appends the plurality of labels to derive the natural language interpretation of the antecedent node.

In another embodiment, the NLIM 116 determines the plurality of labels 212 corresponding to the nodes of consequent "THEN" clauses of the input semantic rule 208. The NLIM 116 derives the list of nodes corresponding to the consequent clauses (hereinafter referred to as consequent nodes) of the input semantic rule 208 and determines the ontology label for each of the consequent nodes based on the node type of each of the consequent nodes. If the node type is determined to be one of "individual", "class", and "property", then the NLIM 116 obtains a fourth ontology label for example URI, previously stored in the semantic data repository 106. In another embodiment, if the node type is not determined to be one of "individual", "class", and "property", then the NLIM 116 determines the variable name information of the consequent node from the semantic data repository 106 as the fourth ontology label of the consequent node.

The NLIM 116 further determines the list of edges associated with each of the consequent nodes, derives the edge type and obtains corresponding ontology label for each of the edges associated with each of the consequent nodes. In one example, if the NLIM 116 determines the edge type equal to "property", then the NLIM 116 obtains a fifth ontology label for example URI, previously stored in the semantic data repository 106. In another embodiment, if the node type is not determined to be equal to "property" "variable", then the NLIM 116 determines the variable name information of the edge from the semantic data repository 106 as the fifth ontology label.

Furthermore, the NLIM determines a right connected (RC) node for each of the derived edges and determines the node type of the RC node and obtains a sixth ontology label corresponding to the RC Node based on the RC node type. In one example, if the NLIM 116 determines the type of the RC node to be one of "individual", "class", and "property", then the NLIM 116 obtains the sixth ontology label for example URI, previously stored in the semantic data repository 106. In another embodiment, if the node type is not determined to be one of "individual", "class", and "property", then the NLIM 116 determines the variable name information of the RC node from the semantic data repository 106 as the sixth ontology label of the RC node. Upon determining the plurality of labels 212 including the fourth, the fifth and the sixth ontology labels, the NLIM 116 appends the plurality of labels to derive the natural language interpretation of the consequent node. The NLIM 116 appends the plurality of labels 212 corresponding to antecedent and consequent nodes to generate the natural language interpretation 210 of the input semantic rule 208. The natural language interpretation 210 thus determined is then verified based on user inputs.

In one embodiment, the SRVM 118 is configured to enable verification of the input semantic rule 208 based on the modification of the natural language interpretation 210. The SRVM 118 receives a plurality of user actions or inputs comprising modification of the one or more sub-clauses of the natural language interpretation 210. For example, the SRVM 118 receives the plurality of user actions including addition, modification, and deletion of the sub-clauses on the natural language interpretation 210 of input, semantic rule 208. The SRVM 118 identifies the one or more edges corresponding to the one or more modified sub-clauses of the natural language interpretation and derives one or more input edge identification information of the one or more identified edges. The SRVM 118 performs mapping of the edge identification information stored in the predetermined semantic rule structure 126 with the derived edge identification information associated with the one or more identified edges. Based on the mapping, the SRVM 118 modifies the edge information associated with the one or more mapping edges and updates the predetermined semantic rule structure 126 based on the modification. Based on the updated semantic rule structure, the SRVM 118 determines the modified natural language interpretation and the modified semantic rule.

The SRVS 102 is further configured to export the modified semantic rule to a text file or to any suitable format. In one embodiment, the semantic rule exporter module 224 exports the modified semantic rule to text file and stores the text file in the semantic data repository 106. The SRVS 102 further updates the semantic data repository 106 with the modified semantic rule and corresponding natural language interpretation for further processing. Thus, the system 100 enables verifiable semantic rule building using non-programming based visualization interface and natural language interpretation, thus improving interoperability and effectiveness of decision making processes.

Figure 3:
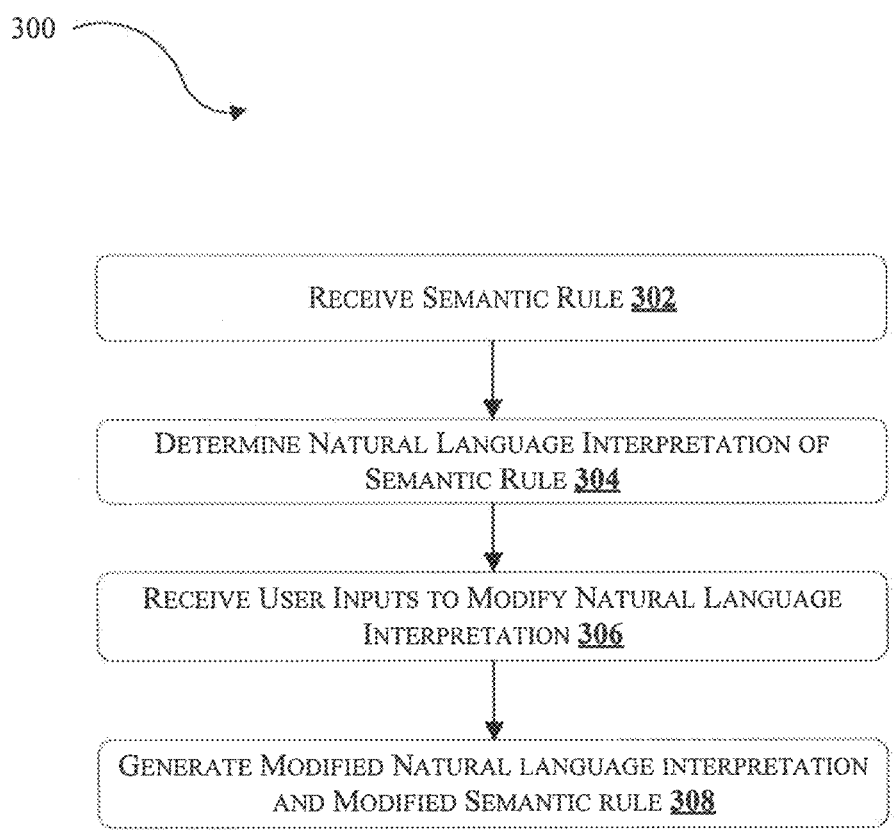
FIG. 3 illustrates a flowchart of an exemplary method of enabling verifiable semantic rule building for semantic data in accordance with some embodiments of the present disclosure.

FIG. 3 illustrates a flowchart of a method of enabling verifiable semantic rules building for semantic data in accordance with some embodiments of the present disclosure.

As illustrated in FIG. 3, the method 300 comprises one or more blocks implemented by the processor 112 for enabling verifiable semantic rules building for semantic data. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method 300. Additionally, individual blocks may be deleted from the method 300 without departing from the spirit and scope of the subject matter described herein. Furthermore, the method 300 can be implemented in any suitable hardware, software, firmware, or combination thereof.

At block 302, receive semantic rule. In one embodiment, the SRVS 102 receives the semantic rule 208 associated with the semantic data as input from the user via the VUI 104. The VDM 120 enables display of the rule workbench visualization canvas to the user loaded with the predefined or historical ontologies 124 from the semantic data repository 106. The historical ontologies 124 may include for example, class, property, and individual components associated with semantic data represented as nodes and edges connecting the nodes. In one example, at least class, property, and individual components are represented as nodes and at least property and variable components are represented as edges connecting the said nodes. The VDM 118 also enables display of the input semantic rule 208 along with corresponding ontologies 124 onto the rule workbench visualization canvas.

At block 304, determine natural language interpretation of semantic rule. In one embodiment, the NLIM 116 receives the input semantic rule 208 and generates the natural language interpretation 210 of the received input semantic rule 208 based on the predetermined semantic rule structure 126 stored in the semantic data repository 106. In one embodiment, the NLIM 116 derives the list of one or more unique variable names and nodes, and corresponding node information and edge information associated with the input semantic rule 208. For example, the NLIM 116 derives the list of nodes corresponding to the antecedent and consequent clauses of the input semantic rule 208 and determines a plurality of labels 212 corresponding to the derived list of nodes of the input semantic rule 208.

In one embodiment, the NLIM 116 determines the plurality of labels 212 corresponding to the nodes of antecedent "IF" clauses of the input semantic rule 208. In one example, the plurality of labels 212 may be the name of the node and edges represented as variable names or URI. The NLIM 116 derives the list of nodes corresponding to the antecedent clauses (hereinafter referred to as antecedent nodes) of the input semantic rule 208 and determines the ontology label for each of the antecedent nodes based on the node type of each of the antecedent nodes. If the node type is determined to be one of "individual", "class", and "property", then the NLIM 116 obtains a first ontology label for example URI, previously stored in the semantic data repository 106. In another embodiment, if the node type is not determined to be one of "individual", "class", and "property", then the NLIM 116 determines the variable name information of the antecedent node from the semantic data repository 106 as the first ontology label of the antecedent node. If the NLIM 116 determines that the variable name information of the antecedent node is not stored in the semantic data repository 106, then the NLIM 116 derives a new variable name for the corresponding antecedent node as the first ontology label of the antecedent node.

The NLIM 116 further determines the list of edges associated with each of the antecedent nodes, derives the edge type and obtains corresponding ontology label for each of the edges associated with each of the antecedent nodes. In one example, if the NLIM 116 determines the edge type equal to "property", then the NLIM 116 obtains a second ontology label for example URI, previously stored in the semantic data repository 106. In another embodiment, if the node type is not determined to be equal to "property" "variable", then the NLIM 116 determines the variable name information of the edge from the semantic data repository 106 as the second ontology label. If the NLIM 116 determines that the variable name information of the edge is not stored in the semantic data repository 106, then the NLIM 116 derives a new variable name for the corresponding edge as the second ontology label.

Furthermore, the NLIM determines a right connected (RC) node for each of the derived edges and determines the node type of the RC node and obtains a third ontology label corresponding to the RC Node based on the RC node type. In one example, if the NLIM 116 determines the type of the RC node to be one of "individual", "class", and "property", then the NLIM 116 obtains the third ontology label for example URI, previously stored in the semantic data repository 106. In another embodiment, if the node type is not determined to be one of "individual", "class", and "property", then the NLIM 116 determines the variable name information of the RC node from the semantic data repository 106 as the third ontology label of the RC node. If the NLIM 116 determines that the variable name information of the RC node is not stored in the semantic data repository 106, then the NLIM 116 derives a new variable name for the corresponding RC node as the third ontology label. Upon determining the plurality of labels 212 including the first, the second and the third ontology labels, the NLIM 116 appends the plurality of labels to derive the natural language interpretation of the antecedent node.

In another embodiment, the NLIM 116 determines the plurality of labels 212 corresponding to the nodes of consequent "THEN" clauses of the input semantic rule 208. The NLIM 116 derives the list of nodes corresponding to the consequent clauses (hereinafter referred to as consequent nodes) of the input semantic rule 208 and determines the ontology label for each of the consequent nodes based on the node type of each of the consequent nodes. If the node type is determined to be one of "individual", "class", and "property", then the NLIM 116 obtains a fourth ontology label for example URI, previously stored in the semantic data repository 106. In another embodiment, if the node type is not determined to be one of "individual", "class", and "property", then the NLIM 116 determines the variable name information of the consequent node from the semantic data repository 106 as the fourth ontology label of the consequent node.

The NLIM 116 further determines the list of edges associated with each of the consequent nodes, derives the edge type and obtains corresponding ontology label for each of the edges associated with each of the consequent nodes. In one example, if the NLIM 116 determines the edge type equal to "property", then the NLIM 116 obtains a fifth ontology label for example URI, previously stored in the semantic data repository 106. In another embodiment, if the node type is not determined to be equal to "property" "variable", then the NLIM 116 determines the variable name information of the edge from the semantic data repository 106 as the fifth ontology label.

Furthermore, the NLIM determines a right connected (RC) node for each of the derived edges and determines the node type of the RC node and obtains a sixth ontology label corresponding to the RC Node based on the RC node type. In one example, if the NLIM 116 determines the type of the RC node to be one of "individual", "class", and "property", then the NLIM 116 obtains the sixth ontology label for example URI, previously stored in the semantic data repository 106. In another embodiment, if the node type is not determined to be one of "individual", "class", and "property", then the NLIM 116 determines the variable name information of the RC node from the semantic data repository 106 as the sixth ontology label of the RC node. Upon determining the plurality of labels 212 including the fourth, the fifth and the sixth ontology labels, the NLIM 116 appends the plurality of labels to derive the natural language interpretation of the consequent node. The NLIM 116 appends the plurality of labels 212 corresponding to antecedent and consequent nodes to generate the natural language interpretation 210 of the input semantic rule 208. For example, let us assume the derived ontology labels for propertyURI1 be "is married to", for individualURI "Lalita Jones", for propertyURI2 "lives with", for classURI "Person", for rdf:type "of type". The NLIM 116 generates the natural language interpretation corresponding to the derived ontology labels as illustrated below:

A resource hereafter identified as person1/i1 exists such that it "is married To" "Lalita Jones" and is of type "Person"

THEN the resource identified by person1/i1 "lives with" "Lalita Jones". The natural language interpretation 210 thus determined is then verified based on user inputs.

At block 306, receive user inputs to modify natural language interpretation. In one embodiment, the SRVM 118 receives a plurality of user actions or inputs comprising modification of the one or more sub-clauses of the natural language interpretation 210. For example, the SRVM 118 receives the plurality of user actions including addition, modification, and deletion of the sub-clauses on the natural language interpretation 210 of input semantic rule 208.

At block 308, modify the semantic rule. In one embodiment, the SRVS 102 verifies the natural language interpretation 212 to enable effective man-machine communication on the semantic rules so as to make efficient decision making. The SRVM 118 identifies the one or more edges corresponding to the one or more modified sub-clauses of the natural language interpretation and derives one or more input edge identification information of the one or more identified edges. The SRVM 118 performs mapping of the edge identification information stored in the predetermined semantic rule structure 126 with the derived edge identification information associated with the one or more identified edges. Based on the mapping, the SRVM 118 modifies the edge information associated with the one or more mapping edges and updates the predetermined semantic rule structure 126 based on the modification. Based on the updated semantic rule structure, the SRVM 118 determines the modified natural language interpretation and the modified semantic rule.

The SRVS 102 is further configured to export the modified semantic rule to a text file or to any suitable format. In one embodiment, the semantic rule exporter module 224 exports the modified semantic rule to text file and stores the text file in the semantic data repository 106. The SRVS 102 further updates the semantic data repository 106 with the modified semantic rule and corresponding natural language interpretation for further processing. Thus, the system 100 enables verifiable semantic rule building using non-programming based visualization interface and natural language interpretation, thus improving interoperability and effectiveness of decision making processes.

Figure 4:
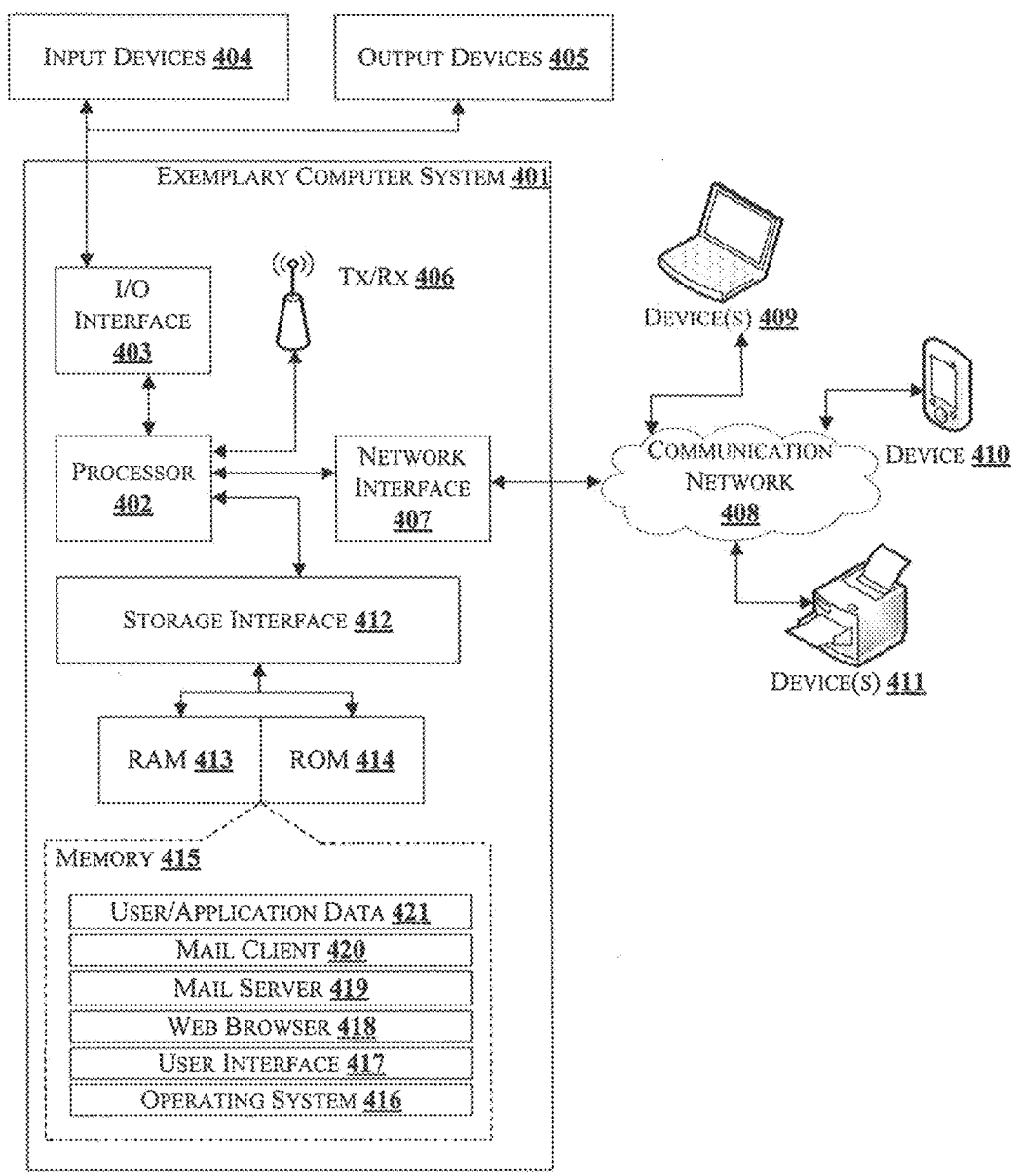
FIG. 4 is a block diagram of an exemplary computer system for implementing embodiments consistent with the present disclosure.

FIG. 4 is a block diagram of an exemplary computer system for implementing embodiments consistent with the present disclosure.

Variations of computer system 401 may be used for implementing all the computing systems that may be utilized to implement the features of the present disclosure. Computer system 401 may comprise a central processing unit ("CPU" or "processor") 402. Processor 402 may comprise at least one data processor for executing program components for executing user- or system-generated requests. The processor may include specialized processing units such as integrated system (bus) controllers, memory management control units, floating point units, graphics processing units, digital signal processing units, etc. The processor 402 may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface 407 may employ connection protocols including, without limitation, direct connect, Ethernet (e.g., twisted pair 10/40/400 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409, 410, and 411. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 415 may store a collection of program or database components, including, without limitation, an operating system 416, user interface application 517, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As described above, the modules 208, amongst other things, include routines, programs, objects, components, and data structures, which perform particular tasks or implement particular abstract data types. The modules 208 may also be implemented as, signal processor(s), state machine(s), logic circuitries, and/or any other device or component that manipulate signals based on operational instructions. Further, the modules 208 can be implemented by one or more hardware components, by computer-readable instructions executed by a processing unit, or by a combination thereof.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for enabling verifiable semantic rule building for a semantic data, said method comprising:
receiving, by a semantic rule verifying system, a semantic rule associated with the semantic data as input, wherein the semantic rule verifying system comprises a processor, a memory a natural language interpretation module, and a visual user interface;
determining, by the natural language interpretation module of the semantic rule verifying system, a natural language interpretation corresponding to the input semantic rule based on a predetermined semantic rule structure, wherein the predetermined semantic rule structure for each semantic rule comprises: one or more unique variable name information, one or more nodes corresponding to antecedent and consequent clauses of the semantic rule node information associated with the one or more nodes, and edge information associated with one or more edges representing the relationship between the one or more nodes;

receiving, by the visual user interface of the semantic rule verifying system, a plurality of user actions to modify the natural language interpretation, wherein the plurality of user actions further comprises receiving modifications on one or more sub-clauses of the natural language interpretation performed by the user;

identifying one or more edges corresponding to the one or more modified sub-clauses of the natural language interpretation and deriving one or more input edge identification information of the one or more identified edges;

mapping the edge identification information stored in the predetermined semantic rule structure with the derived edge identification information associated with the one or more identified edges;

modifying the edge information associated with the one or more identified edges and updating the predetermined semantic rule structure based on the mapping and the modification of the one or more modified sub-clauses;

generating, by the semantic rule verifying system, a modified natural language interpretation and modified semantic rule based on the plurality of user actions and the updated predetermined semantic rule structure;

executing, by a processor, the modified semantic rule on semantic the data; and displaying, by the visual user interface, one or more results of the execution.

2. The method as claimed in claim 1, wherein determining the natural language interpretation of the input semantic rule comprises the steps of:

deriving a list of one or more unique variable names, one or more nodes representing entity of the input semantic rule and one or more edges representing the relationship between the nodes;

obtaining a plurality of labels from the semantic data repository for each of the derived unique variable name, one or more nodes and one or more edges of the input semantic rule; and appending the plurality of labels to determine the natural language interpretation of the input semantic rule.

3. The method as claimed in claim 1, wherein the semantic data is represented in resource description framework (RDF) and the semantic rule is represented in Jena rule syntax.

4. A semantic rule verifying system for enabling verifiable semantic rule building for a semantic data, comprising:

a processor;

a semantic data repository coupled with the processor and configured to store a predetermined semantic rule structure, wherein the predetermined semantic rule structure for each semantic rule comprises:

one or more unique variable name information, one or more nodes corresponding to antecedent and consequent clauses of the semantic rule, node information associated with the one or more nodes, and edge information associated with one or more edges representing the relationship between the one or more nodes; and a memory communicatively coupled to the processor, wherein the memory stores processor-executable instructions, which, on execution, cause the processor to:

receive a semantic rule associated with the semantic data as input;

determine a natural language interpretation corresponding to the input semantic rule based on the predetermined semantic rule structure;

receive a plurality of user actions to modify the natural language interpretation, wherein the plurality of user actions further comprises receiving modifications on one or more sub-clauses of the natural language interpretation performed by the user;

identifying one or more edges corresponding to the one or more modified sub-clauses of the natural language interpretation and deriving one or more input edge identification information of the one or more identified edges;

mapping the edge identification information stored in the predetermined semantic rule structure with the derived edge identification information associated with the one or more identified edges;

modifying the edge information associated with the one or more identified edges and updating the predetermined semantic rule structure based on the mapping and the modification of the one or more modified sub-clauses;

generate a modified natural language interpretation and a modified semantic rule based on the plurality of user actions and the updated predetermined semantic rule structure;

execute the modified semantic rule on semantic the data; and display one or more results of the execution.

5. The semantic rule verifying system as claimed in claim 4, wherein the processor is configured to determine the natural language interpretation of the semantic rule by performing the steps of:

deriving the list of one or more unique variable names, one or more nodes representing entity of the input semantic rule and one or more edges representing the relationship between the nodes;

obtaining a plurality of labels from the semantic data repository for each of the derived unique variable name, one or more nodes and one or more edges of the input semantic rule; and appending the plurality of labels to determine the natural language interpretation of the input semantic rule.

6. The system as claimed in claim 4, wherein the semantic data is represented in resource description framework (RDF) and the semantic rule is represented in Jena rule syntax.

7. A non-transitory computer readable medium including instructions stored thereon that when processed by at least one processor cause a semantic rule verifying system to perform acts of:

receiving, by a semantic rule verifying system, a semantic rule associated with the semantic data as input, wherein the semantic rule verifying system comprises a processor, a memory, a natural language interpretation module, and a visual user interface;

determining, by the semantic rule verifying system, a natural language interpretation corresponding to the input semantic rule based on a predetermined semantic rule structure, wherein the predetermined semantic rule structure for each semantic rule comprises:
one or more unique variable name information,
one or more nodes corresponding to antecedent and consequent clauses of the semantic rule,
node information associated with the one or more nodes, and
edge information associated with one or more edges representing the relationship between the one or more nodes;
receiving, by a visual user interface of the semantic rule verifying system, a plurality of user actions to modify the natural language interpretation, wherein the plurality of user actions further comprises receiving modifications on one or more sub-clauses of the natural language interpretation performed by the user;
identifying one or more edges corresponding to the one or more modified sub-clauses of the natural language interpretation and deriving one or more input edge identification information of the one or more identified edges;
mapping the edge identification information stored in the predetermined semantic rule structure with the derived edge identification information associated with the one or more identified edges;
modifying the edge information associated with the one or more identified edges and updating the predetermined semantic rule structure based on the mapping and the modification of the one or more modified sub-clauses;
generating, by the semantic rule verifying system, a modified natural language interpretation and a modified semantic rule based on the plurality of user actions and the updated predetermined semantic rule structure;
executing, by a processor, the modified semantic rule on semantic the data; and
displaying, by the visual user interface, one ore more results of the execution.

8. The medium as claimed in claim 7, wherein the instructions, on execution, cause the at least one processor to determine the natural language interpretation of the input semantic rule by the steps of:
deriving the list of one or more unique variable names, one or more nodes representing entity of the input semantic rule and one or more edges representing the relationship between the nodes;
obtaining a plurality of labels from the semantic data repository for each of the derived unique variable name, one or more nodes and one or more edges of the input semantic rule; and
appending the plurality of labels to determine the natural language interpretation of the input semantic rule.

9. The medium as claimed in claim 7, wherein the semantic data is represented in resource description framework (RDF) and the semantic rule is represented in Jena rule syntax.

10. The method of claim 1, wherein the plurality of user actions comprise user inputs into web browsers.

11. The system of claim 4, wherein the plurality of user actions comprise user inputs into web browsers.

12. The medium of claim 7, wherein the plurality of user actions comprise user inputs into web browsers.

13. The method of claim 1, further comprising
determining, by the natural language interpretation module of the semantic rule verifying system, whether variable name information of an antecedent node is stored in the semantic data;
creating, by the natural language interpretation module of the semantic rule verifying system, a new variable name for the antecedent node whose variable name information is not stored in the semantic data as the first ontology label of the antecedent node.

* * * * *